United States Patent
Lin et al.

(10) Patent No.: US 12,240,949 B2
(45) Date of Patent: Mar. 4, 2025

(54) MATERIAL FOR MANUFACTURING CONTACT LENSES AND CONTACT LENS THEREOF

(71) Applicant: INNO VISION CORP., Taipei (TW)

(72) Inventors: Ji-Yu Lin, Hsinchu County (TW); Yu-Ya Liao, Hsinchu County (TW)

(73) Assignee: INNO VISION CORP., Taipei (TW)

( * ) Notice: Subject to any disclaimer, the term of this patent is extended or adjusted under 35 U.S.C. 154(b) by 938 days.

(21) Appl. No.: 17/344,166

(22) Filed: Jun. 10, 2021

(65) Prior Publication Data

US 2022/0220261 A1    Jul. 14, 2022

(30) Foreign Application Priority Data

Jan. 13, 2021   (TW) ................. 110101253

(51) Int. Cl.
| | | |
|---|---|---|
| C08G 77/18 | (2006.01) | |
| C08F 230/08 | (2006.01) | |
| C08G 77/06 | (2006.01) | |
| C08J 3/075 | (2006.01) | |
| G02C 7/04 | (2006.01) | |

(52) U.S. Cl.
CPC .......... *C08G 77/18* (2013.01); *C08F 230/085* (2020.02); *C08G 77/06* (2013.01); *C08J 3/075* (2013.01); *G02C 7/04* (2013.01)

(58) Field of Classification Search
CPC .................................................... C08G 77/18
See application file for complete search history.

(56) References Cited

U.S. PATENT DOCUMENTS

| | | | |
|---|---|---|---|
| 9,464,159 B2 | 10/2016 | Rashid et al. | |
| 9,708,450 B2 | 7/2017 | Lin | |
| 10,676,575 B2 | 6/2020 | Zhang et al. | |
| 2018/0340036 A1 | 11/2018 | Lai et al. | |

FOREIGN PATENT DOCUMENTS

EP    2443484 B1    12/2015

*Primary Examiner* — Wenwen Cai
(74) *Attorney, Agent, or Firm* — Muncy, Geissler, Olds & Lowe P.C

(57) ABSTRACT

A material for manufacturing contact lenses comprises a first composition, a second composition, at least one hydrophilic monomer and at least one photoinitiator. The first composition and the second composition are respectively represented by the following formula (1) and formula (2).

formula (1)

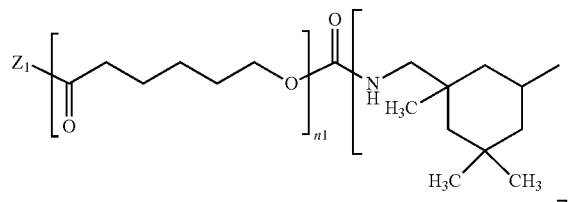

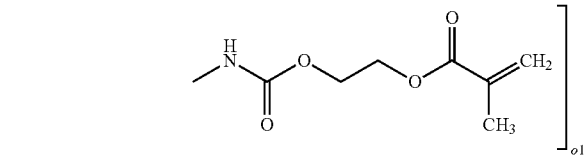

formula (2)

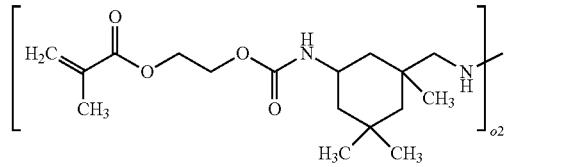

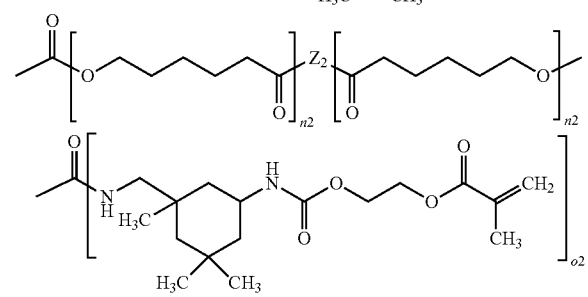

Z1 is a first silicone hydrogel monomer, n1 is ranged between 1 and 1.5, and o1 is ranged between 1 and 2; and Z2 is a second silicone hydrogel monomer, n2 is ranged between 1 and 5, and o2 is ranged between 1 and 2.

9 Claims, No Drawings

MATERIAL FOR MANUFACTURING CONTACT LENSES AND CONTACT LENS THEREOF

FIELD OF THE INVENTION

The invention relates to a material for manufacturing contact lenses and a contact lens thereof, and more particularly to a material including silicone hydrogel for manufacturing contact lenses and a contact lens thereof.

BACKGROUND OF THE INVENTION

Silicone hydrogel is currently a main material used to make soft contact lenses on the market. It combines the high oxygen permeability of "silicone" and the hydrophilicity of "hydrogel" so that oxygen can directly pass through the lens and contact the cornea to maintain sufficient oxygen content and high moisture content in the lens to improve comfort of wearing. Thus, contact lenses with silicone hydrogel can reduce the symptoms of discomfort due to corneal hypoxia or eye dehydration, thereby prolonging the wear time of the users.

However, in order to further improve the wearing comfort, many manufacturers and research teams have improved the composition and structure of silicone hydrogel to optimize the oxygen permeability and moisture content of contact lenses. For example, European Patent No. EP2443484B1 provides a silicone hydrogel comprising (a) one or more siloxane-containing homopolymers, and (b) one or more biomedical device-forming monomers, wherein the monomer is a hydrophilic monomer selected from a group consisting of methacrylic acid, acrylic acid, 2-hydroxyethylmethacrylate, 2-hydroxyethylacrylate, N-vinyl pyrrolidone, N-vinyl caprolactone, methacrylamide, N,N-dimethylacrylamide, ethylene glycol dimethacrylate and mixtures thereof. In addition, U.S. Patent No. U.S. Pat. No. 9,464,159B2 provides a contact lens comprising (a) at least one polyol of formula (I), (b) at least one diisocyanate or polyisocyanate, and (c) at least one OH-terminated chain extender. Furthermore, U.S. Patent Publication No. US20180340036A, and U.S. Pat. Nos. U.S. Ser. No. 10/676,575B2 and U.S. Pat. No. 9,708,450B2 also disclose the structural compositions of other improved silicone hydrogels.

However, the existing silicone hydrogel contact lenses still have the problem of insufficient oxygen and moisture content while maintaining the necessary mechanical properties. Therefore, how to manufacture contact lenses that can improve wearing comfort and maintain necessary mechanical properties at the same time is a main issue to be solved in the technical field.

SUMMARY OF THE INVENTION

An object of the invention is to solve the problem of insufficient oxygen and moisture contents in known silicone hydrogel contact lenses.

In order to achieve the above object, the invention provides a material for manufacturing contact lenses, comprising:

a first composition represented by the following formula (1):

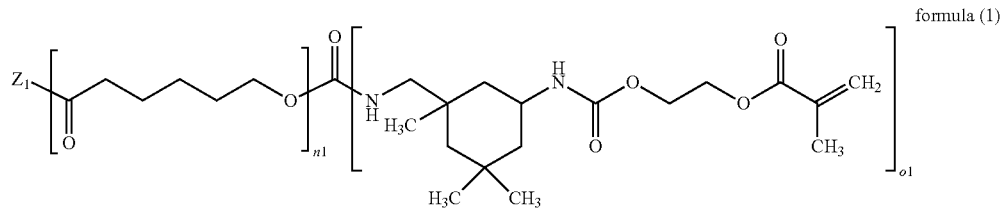

formula (1)

wherein $Z_1$ is a first silicone hydrogel monomer, $n_1$ is ranged between 1 and 1.5, and $o_1$ is ranged between 1 and 2;

a second composition represented by the following formula (2):

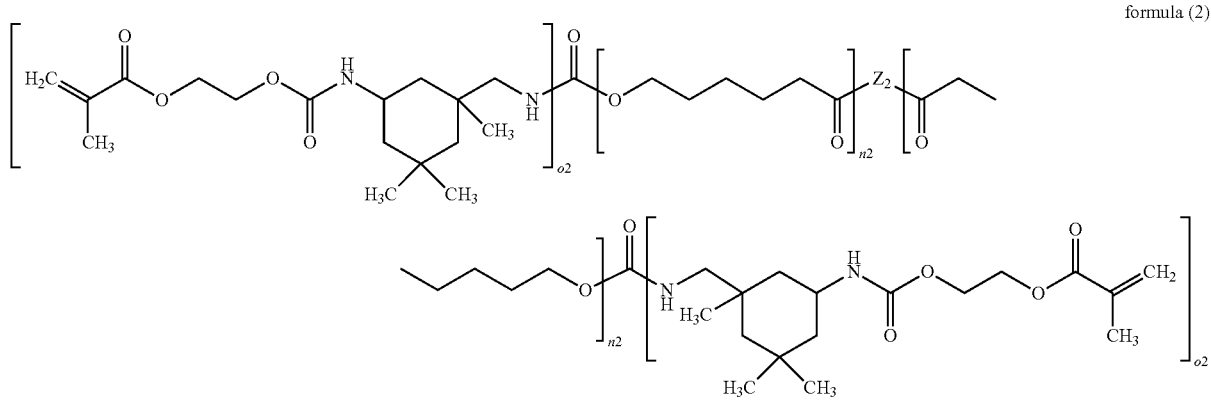

formula (2)

wherein Z2 is a second silicone hydrogel monomer, n2 is ranged between 1 and 5, and o2 is ranged between 1 and 2;
at least one hydrophilic monomer; and
at least one photoinitiator.

In one embodiment, wherein the first silicone hydrogel monomer Z1 is represented by the following formula (4):

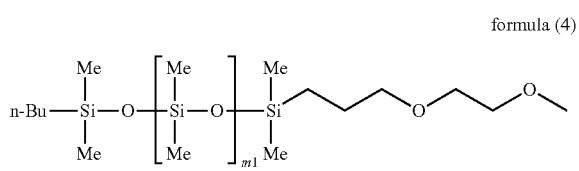

formula (4)

wherein m1 is ranged between 1 and 3.

In one embodiment, wherein the second silicone hydrogel monomer Z2 is represented by the following formula (5):

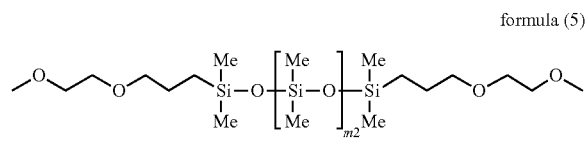

formula (5)

wherein m2 is ranged between 1 and 3.

In one embodiment, wherein further comprising:
a third composition represented by the following formula (3):

wherein Z3 is a third silicone hydrogel monomer, n3 is ranged between 4 and 6, o3 is ranged between 4 and 5.

In one embodiment, wherein the third silicone hydrogel monomer Z3 is represented by the following formula (6):

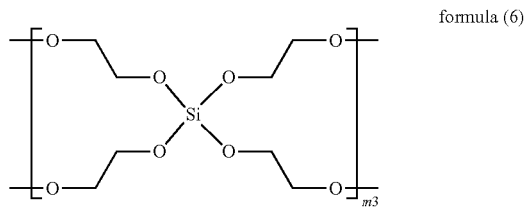

formula (6)

wherein m3 is 1.

In one embodiment, wherein the hydrophilic monomer is selected from a group consisting at least one of 2-hydroxyethyl methacrylate, N-vinylpyrrolidone, methacrylic acid, N,N-dimethylacrylamide and combinations thereof.

In one embodiment, the material further comprises a solvent and a crosslinking agent, the solvent is isopropyl alcohol, and the crosslinking agent is trimethylolpropane trimethacrylate.

The invention also provides a contact lens comprising the above-mentioned material.

The invention further provides a material for manufacturing contact lenses, comprising:
a first composition represented by the following formula (1):

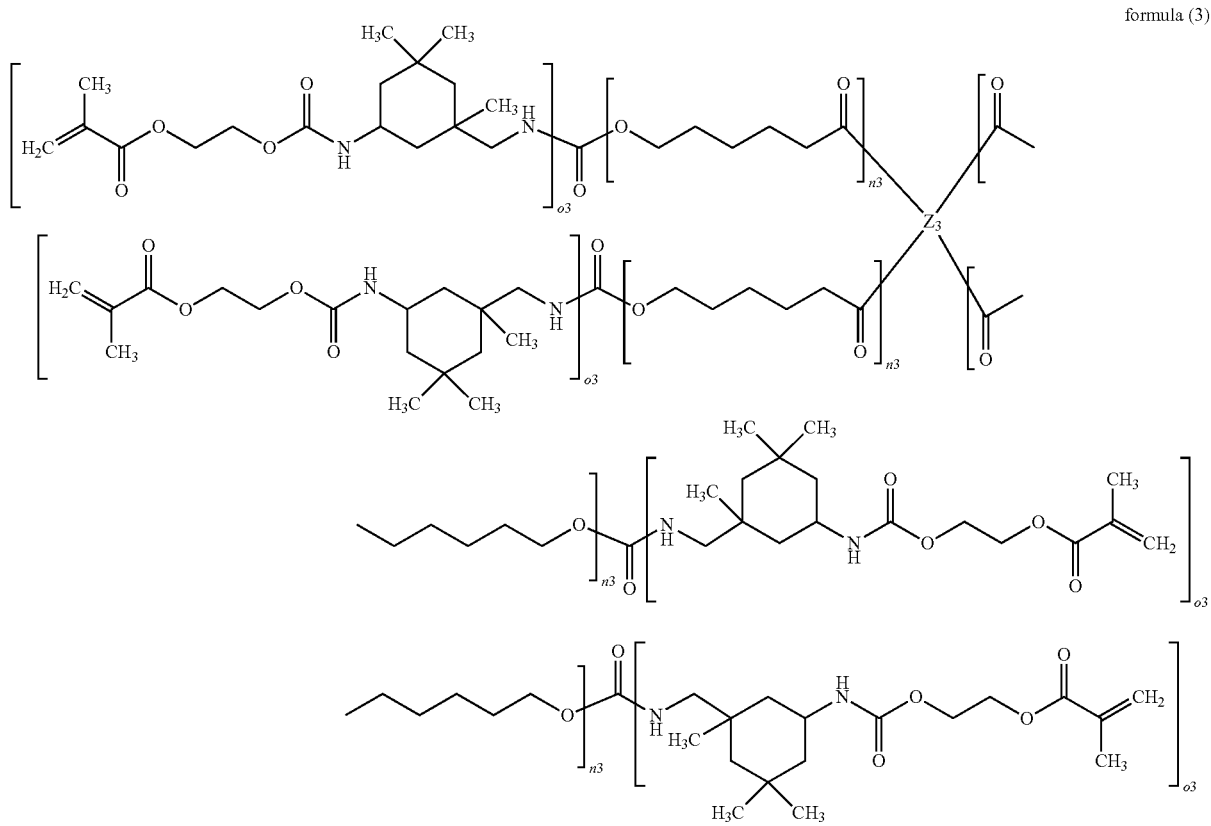

formula (3)

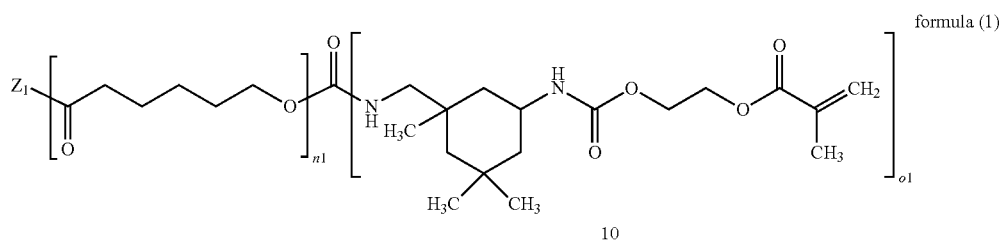

formula (1)

wherein Z1 is a first silicone hydrogel monomer, n1 is ranged between 1 and 1.5, and o1 is ranged between 1 and 2;

a third composition represented by the following formula (3):

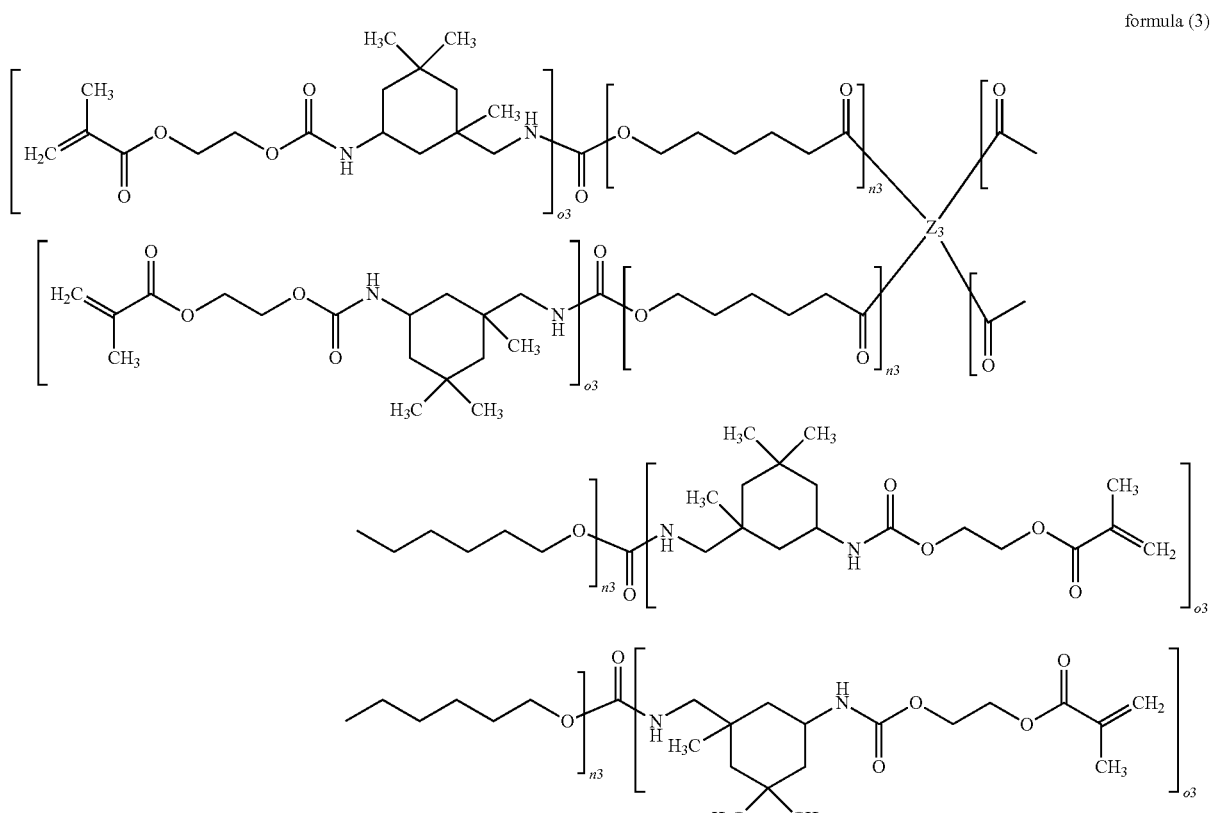

formula (3)

wherein Z3 is a third silicone hydrogel monomer, n3 is ranged between 4 and 6, and o3 is ranged between 4 and 5;
at least one hydrophilic monomer; and
at least one photoinitiator.

In one embodiment, wherein the first silicone hydrogel monomer Z1 is represented by the following formula (4):

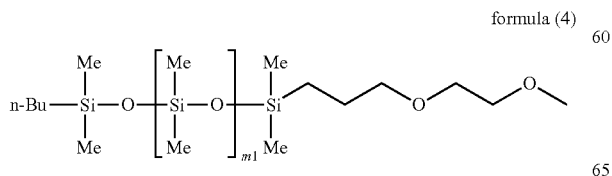

formula (4)

wherein m1 is ranged between 1 and 3.

In one embodiment, wherein the third silicone hydrogel monomer Z3 is represented by the following formula (6):

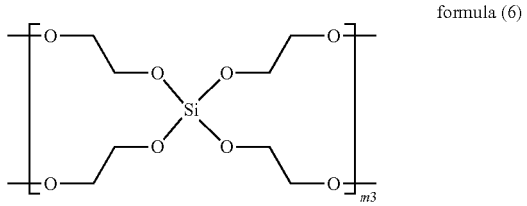

formula (6)

wherein m3 is 1.

In one embodiment, the material further comprises:
a second composition represented by the following formula (2),

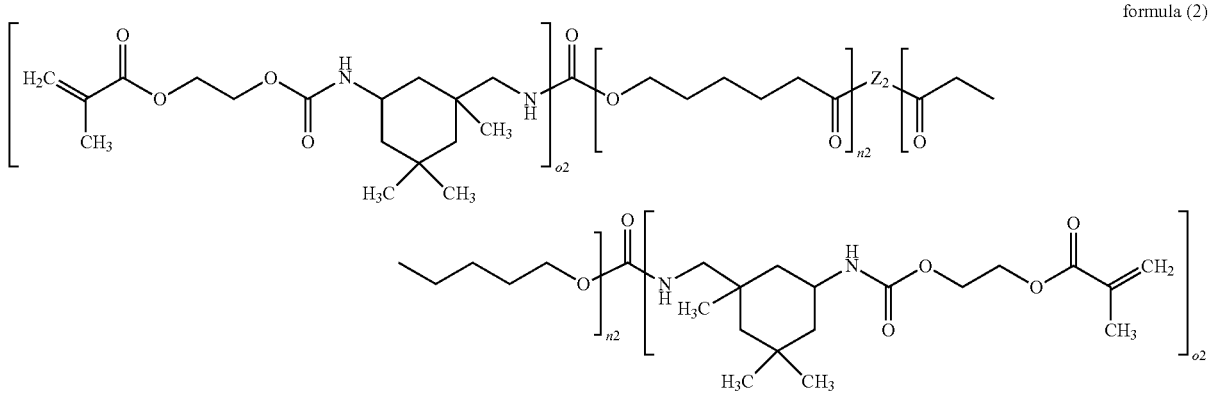

formula (2)

wherein Z2 is a second silicone hydrogel monomer, n2 is ranged between 1 and 5, o2 is ranged between 1 and 2.

In one embodiment, wherein the second silicone hydrogel monomer Z2 is represented by the following formula (5):

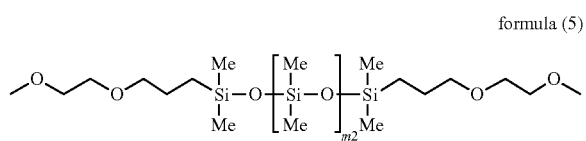

formula (5)

wherein m2 is ranged between 1 and 3.

In one embodiment, wherein the hydrophilic monomer is selected from a group consisting at least one of 2-hydroxyethyl methacrylate, N-vinylpyrrolidone, methacrylic acid, N,N-dimethylacrylamide, and combinations thereof.

In one embodiment, the material further comprises a solvent and a crosslinking agent, the solvent is isopropyl alcohol, and the crosslinking agent is trimethylolpropane trimethacrylate.

The invention further provides a contact lens comprising the above-mentioned material.

DETAILED DESCRIPTION OF THE PREFERRED EMBODIMENTS

A term "first composition" used herein refers to a structural unit including silicone-containing monomer represented by the following formula (1):

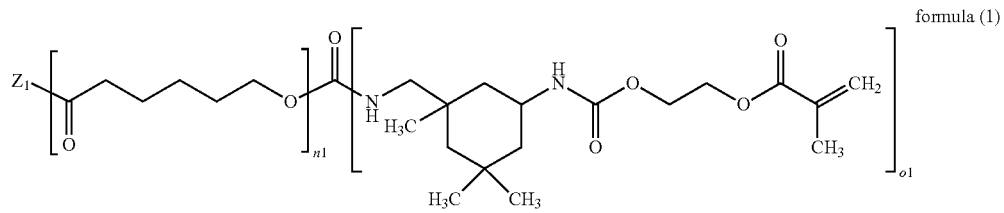

formula (1)

wherein Z1 is a first silicone hydrogel monomer, n1 is ranged between 1 and 1.5, and o is ranged between 1 and 2.

In one embodiment, o1 is 1, that is, the "first composition" is a structural unit including silicone-containing monomer represented by the following formula:

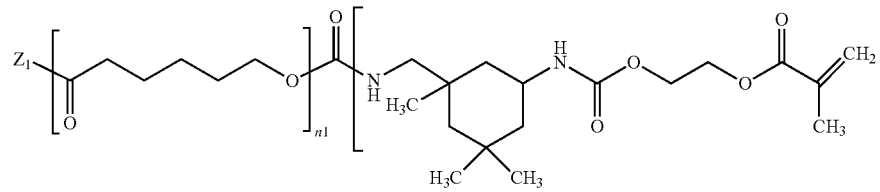

In one embodiment, the "first composition" further refers to a structural unit including silicone-containing monomer represented by the following formula (1'):

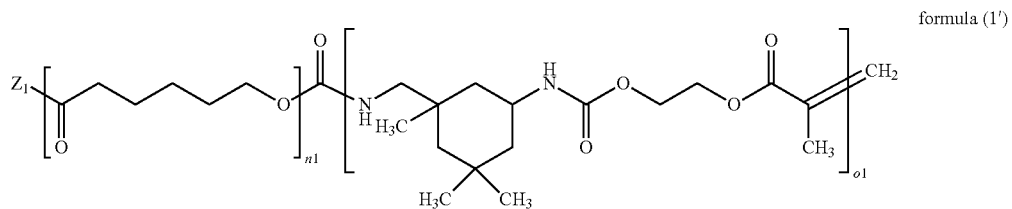

formula (1')

A term "second composition" used herein refers to a structural unit including silicone-containing monomer represented by the following formula (2):

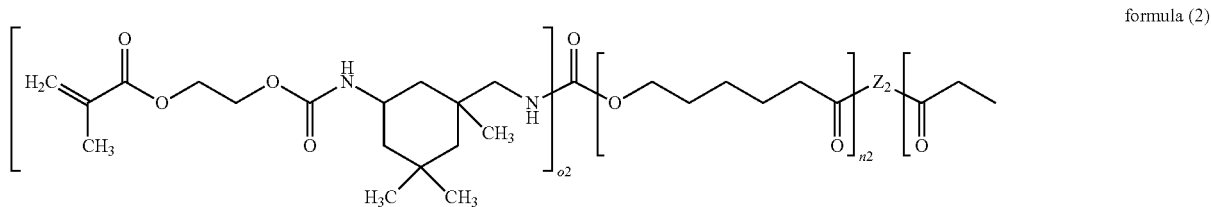

formula (2)

wherein Z2 is a second silicone hydrogel monomer, n2 is ranged between 1 and 5, and o2 is ranged between 1 and 2.

In one embodiment, o2 is 1, that is, the "second composition" is a structural unit including silicone-containing monomer represented by the following formula:

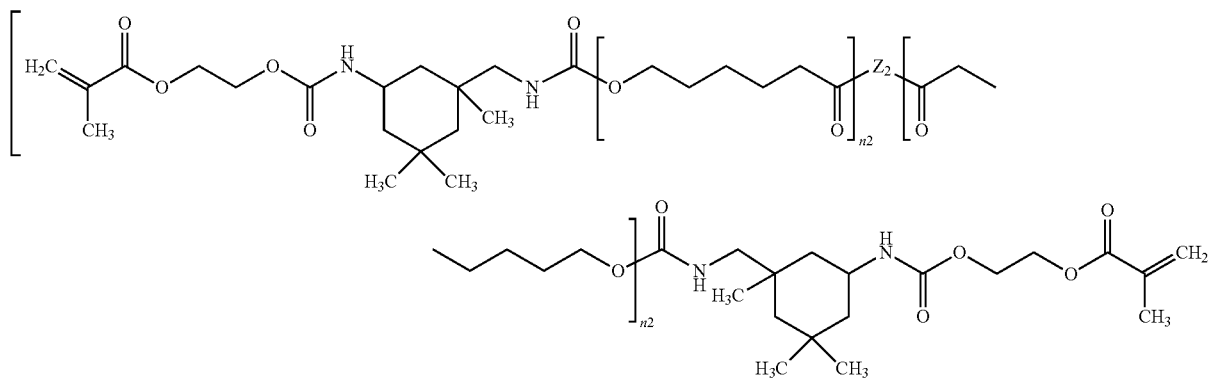

In one embodiment, the "second composition" further refers to a structural unit including silicone-containing monomer represented by the following formula (2'):

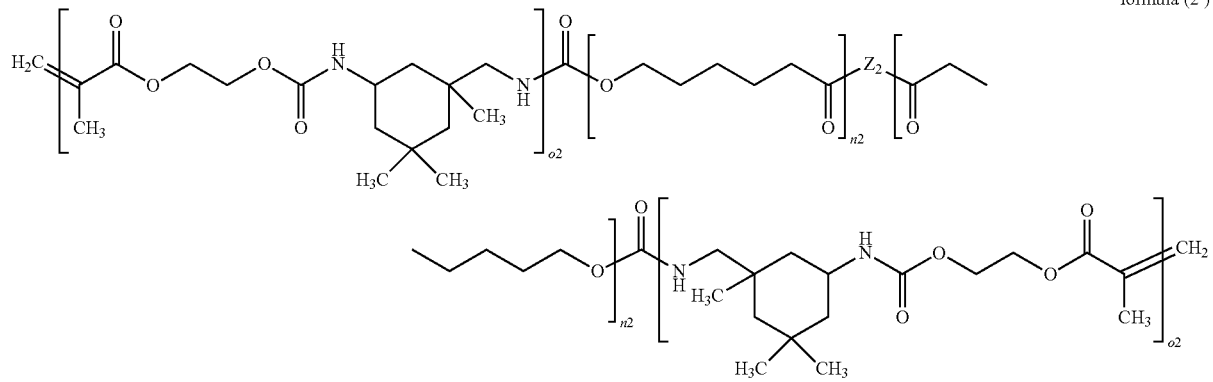

formula (2')

A term "third composition" used herein refers to a structural unit including silicone-containing monomer represented by the following formula (3):

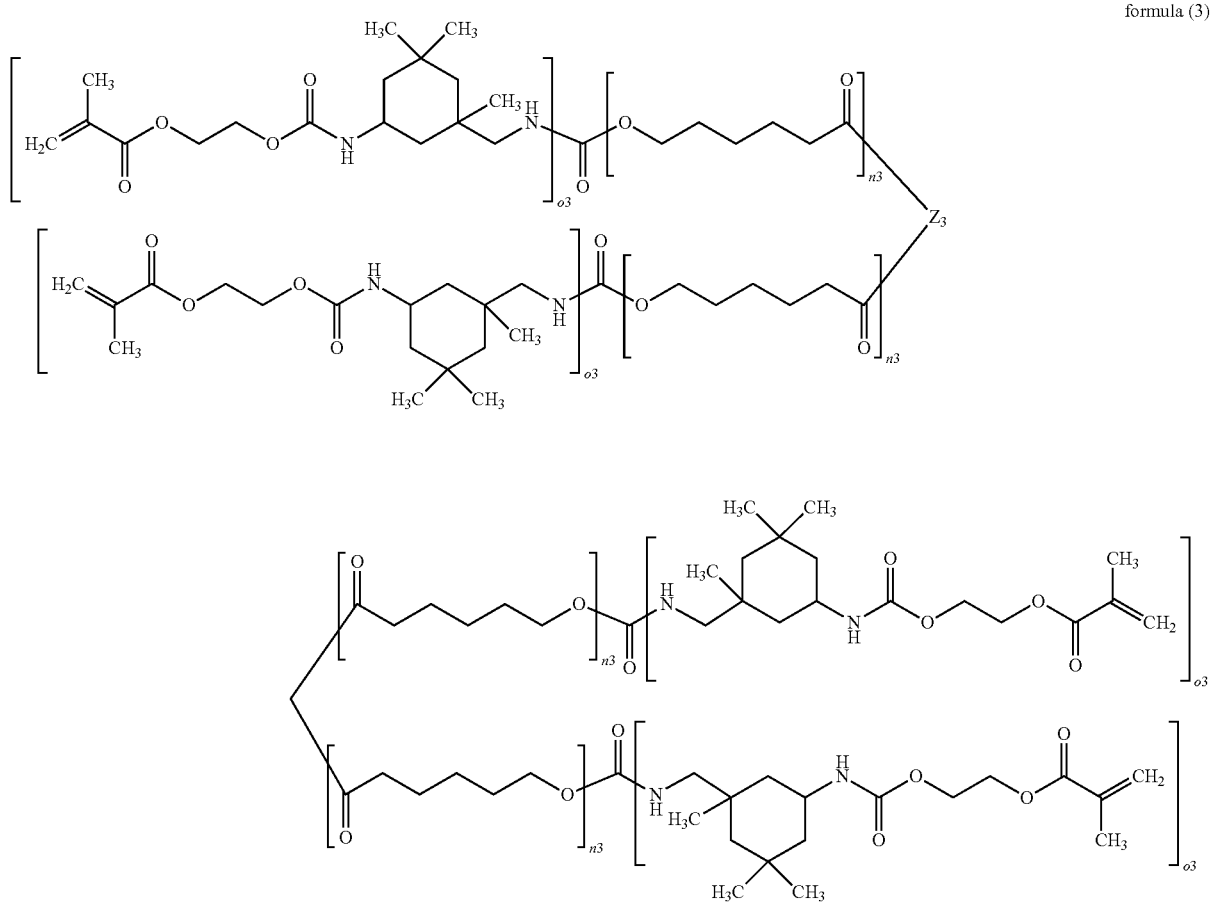

formula (3)

wherein $Z_3$ is a third silicone hydrogel monomer, n3 is ranged between 4 and 6, and o3 is ranged between 0 and 1.

In one embodiment, o3 is 1, that is, the "third composition" is a structural unit including silicone-containing monomer represented by the following formula:

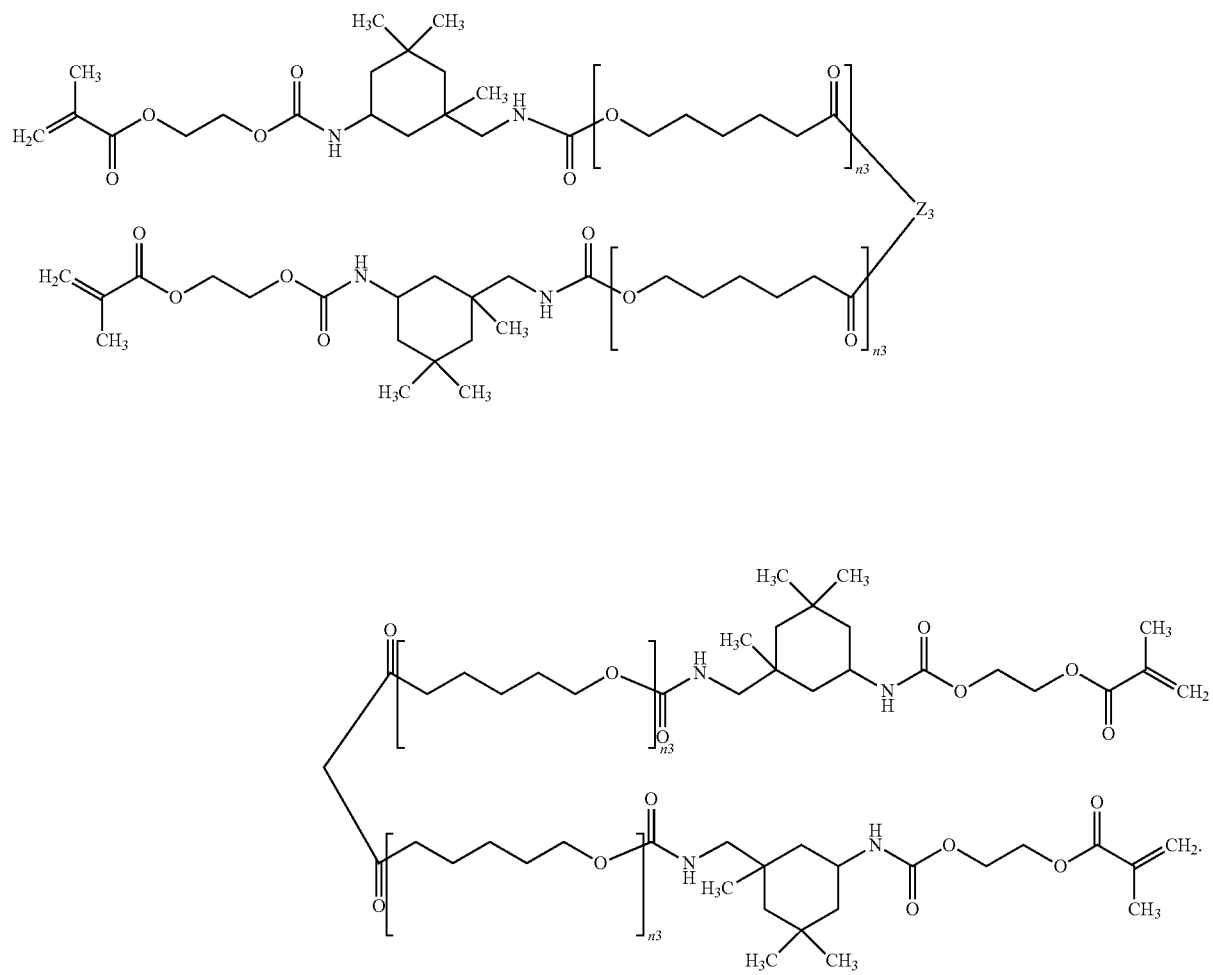
In one embodiment, the "third composition" further refers to a structural unit including silicone-containing monomer represented by the following formula (3'):
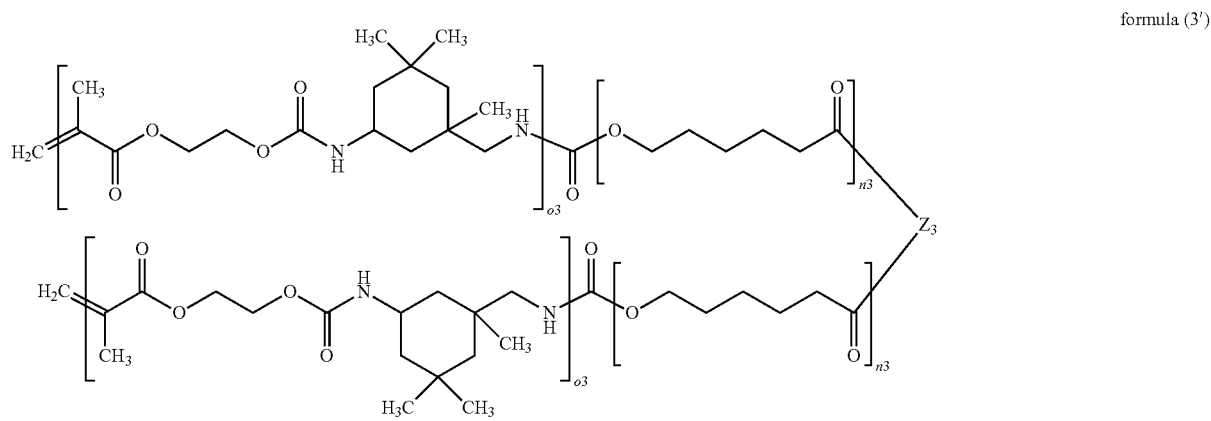
formula (3')

-continued

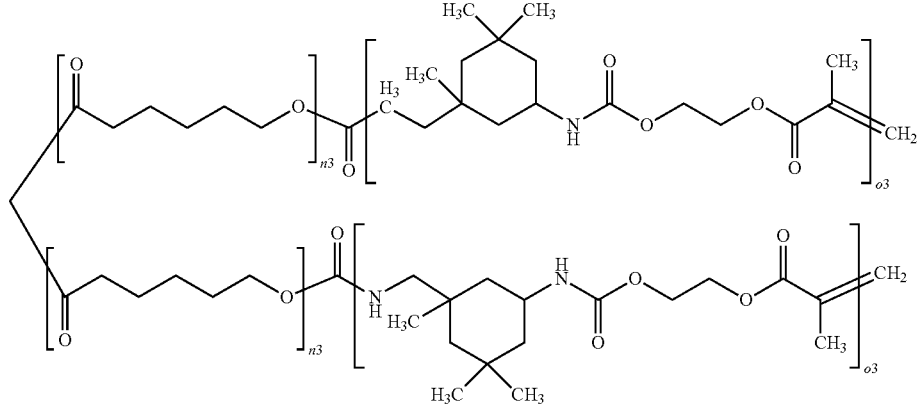

The aforementioned n1, o1, n2, o2, n3 and o3 can be integers or non-integers.

The invention provides a material for manufacturing contact lenses. According to one embodiment, the material comprises a first composition, a second composition, at least one hydrophilic monomer and at least one photoinitiator; according to another embodiment, the material comprises a first composition, a third composition, at least one hydrophilic monomer and at least one photoinitiator; and according to another embodiment, the material comprises a first composition, a second composition, a third composition, at least one hydrophilic monomer and at least one photoinitiator.

In one embodiment, the first silicone hydrogel monomer Z1 is represented by the following formula (4):

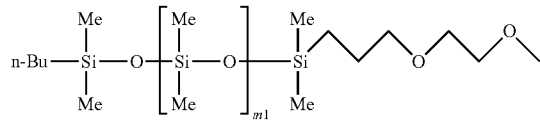

formula (4)

wherein m1 is ranged between 1 and 3.

In one embodiment, the second silicone hydrogel monomer Z2 is represented by the following formula (5):

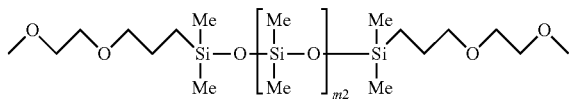

formula (5)

wherein m2 is ranged between 1 and 3.

The above-mentioned m1, m2 can be integers or non-integers.

In one embodiment, the third silicone hydrogel monomer Z3 is represented by the following formula (6):

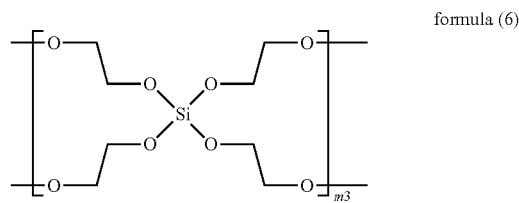

formula (6)

wherein m3 is 1.

The hydrophilic monomer includes at least one polymerizable double bond functional group and at least one hydrophilic functional group, wherein the polymerizable double bond functional group is a monomer containing acrylic or vinyl. In one embodiment, the hydrophilic monomer is selected from a group consisting at least one of 2-hydroxyethyl methacrylate (HEMA), N-vinylpyrrolidone (NVP), methacrylic acid (MAA), N,N-dimethylacrylamide (DMA) and combinations thereof. The photoinitiator is selected from any initiator excited by light (such as ultraviolet light) to initiate a chemical chain reaction with the first composition, the second composition and/or the third composition, as well as the hydrophilic monomer. In one embodiment, the photoinitiator is Darocur®1173 (2-hydroxy-2-methylpropiophenone) or Irgacure®819 (phenyl bis(2,4,6-trimethylbenzoyl)-phosphine oxide).

In one embodiment, the material further comprises a solvent and a cross-linking agent. In this embodiment, the solvent is isopropyl alcohol (IPA), and the cross-linking agent is trimethylolpropane trimethacrylate (TMPTMA).

In one embodiment, a weight average molecular weight (Mw) of formula (1) is ranged between 1700 and 2100, and a molecular weight distribution (Mw/Mn) is ranged between 1.5 and 2.0. A weight average molecular weight (Mw) of formula (2) is ranged between 3000 and 4560, and a molecular weight distribution (Mw/Mn) is ranged between 1.5 and 2.0. A weight average molecular weight (Mw) of formula (3) is ranged between 2246 and 3219, and a molecular weight distribution (Mw/Mn) is ranged between 1.5 and 2.0.

In one embodiment, the material for manufacturing contact lenses comprises formula (1), formula (2), and/or formula (3), as well as additives. A weight percentage of formula (1), the first composition, is ranged between 35 wt. % and 50 wt. %; a weight percentage of formula (2), the second composition, is ranged between 0 wt. % and 20 wt. %; a weight percentage of formula (3), the third composition, is ranged between 0 wt. % and 20 wt. %; and a weight percentage of the additives is ranged between 15 wt. % and 35 wt. %. The additives are a sum of the hydrophilic monomer, the photoinitiator, the solvent and the crosslinking agent.

An oxygen permeability of the contact lenses prepared by the material of the invention includes a value of Dk ranged between 70 and 115; a moisture content of the contact lenses is ranged between 30% and 45%; and a Young's modulus of the contact lenses is ranged between 0.2 MPa and 1.2 MPa.

The following preparation examples are used to illustrate synthesis methods of the silicone hydrogel monomer of formula (1), formula (2) and formula (3).

Preparation Example 1

Add 80 mL of tetrahydrofuran (THF), 40 g of monocarbinol terminated polydimethylsiloxane, 13.69 g of ε-Caprolactone, and 0.0040 g of dibutyltin dilaurate into a three-necked flask, mix into a solution A. The solution A is stirred at 120° C. for 6 hours to carry out ring-opening polymerization (ROP). After that, a reactant is washed with pure water and dehydrated and filtered to obtain an intermediate with a weight average molecular weight (Mw) of 1200. The intermediate is represented by the following formula (Ia):

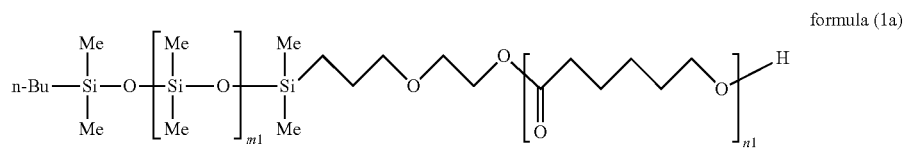

formula (1a)

m1 is ranged between 1 and 3, and n1 is ranged between 1 and 1.5.

Further, the intermediate is mixed with 2.52 g of isophorone diisocyanate (IPDI), reacted at 45° C. for 5 hours, and then 0.0025 g of dibutyltin dilaurate is dropped to form a solution B. Then, 1.48 g of 2-hydroxyethyl methacrylate (HEMA) and 0.0015 g of dibutyltin dilaurate are dropped into the solution B and reacted at 45° C. for 3 hours.

Finally, tetrahydrofuran (THF) in the solution B is removed by evaporation to obtain a product with a weight average molecular weight (Mw) of 1800, and the product is represented by the following formula (Ib):

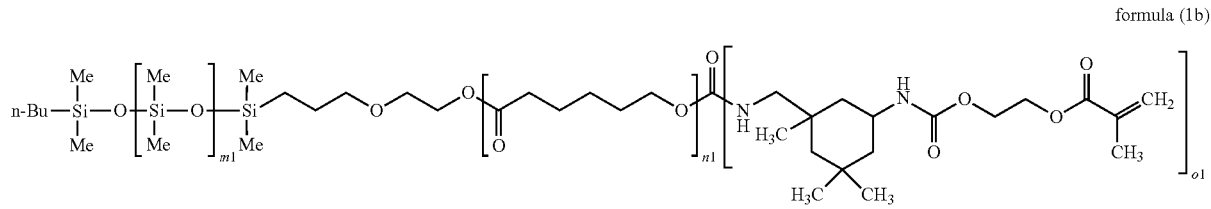

formula (1b)

m1 is ranged between 1 and 3, n1 is ranged between 1 and 1.5, and o1 is ranged between 1 and 2.

Preparation Example 2

Add 100 mL of tetrahydrofuran (THF), 50 g of monocarbinol terminated polydimethylsiloxane, 5.8 g of ε-Caprolactone and 0.0040 g of dibutyltin dilaurate into a three-necked flask, mix into a solution C. The solution C is stirred at 120° C. for 6 hours to carry out ring-opening polymerization (ROP). After that, a reactant is washed with pure water and dehydrated and filtered to obtain an intermediate with a weight average molecular weight (Mw) of 3018. The intermediate is represented by the following formula (2a):

formula (2a)

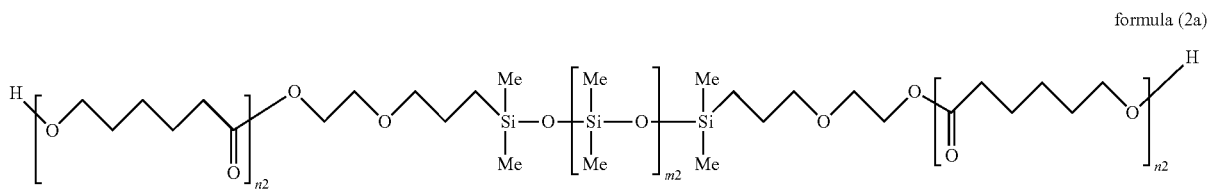

n2 is ranged between 1 and 5, and m2 is ranged between 1 and 3.

Further, the intermediate is mixed with 11.12 g of isophorone diisocyanate (IPDI), reacted at 45° C. for 5 hours, and then 0.001 g of dibutyltin dilaurate is dropped to form a solution D. Then, 6.6 g of 2-hydroxyethyl methacrylate (HEMA) and 0.006 g of dibutyltin dilaurate are dropped into the solution D and reacted at 45° C. for 3 hours.

Finally, tetrahydrofuran (THF) in the solution D is removed by evaporation to obtain a product with a weight average molecular weight (Mw) of 3760, and the product is represented by the following formula (2b):

formula (2b)

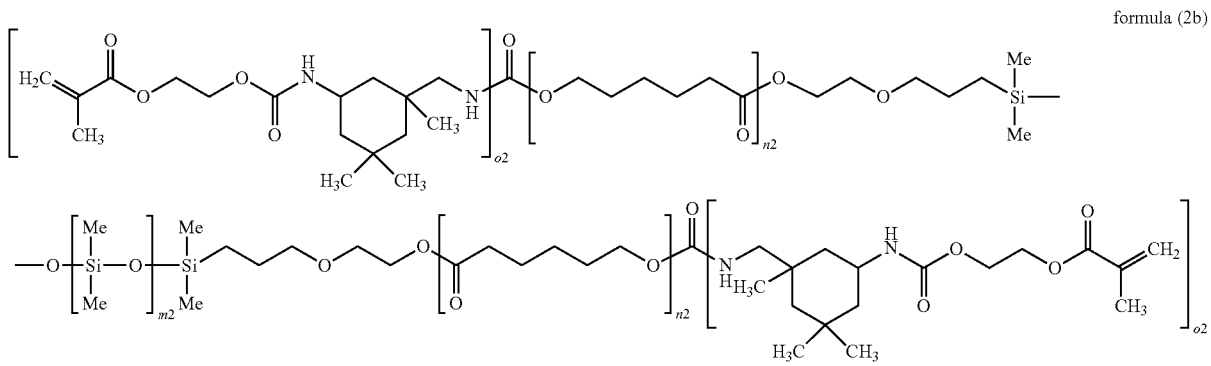

m2 is ranged between 1 and 3, n2 is ranged between 1 and 5, and o2 is ranged between 1 and 2.

Preparation Example 3

Add 120 mL of tetrahydrofuran (THF), 54.4 g of tetrakis (2-hydroxyethoxy)silane, 91.32 g of ε-Caprolactone and 0.0054 g of dibutyltin dilaurate into a three-necked flask, mix into a solution E. The solution E is stirred at 120° C. for 6 hours to carry out ring-opening polymerization (ROP). After that, a reactant is washed with a large amount of water and dehydrated and filtered to obtain an intermediate with a weight average molecular weight (Mw) of 738. The intermediate is represented by the following formula (3a):

formula (3a)

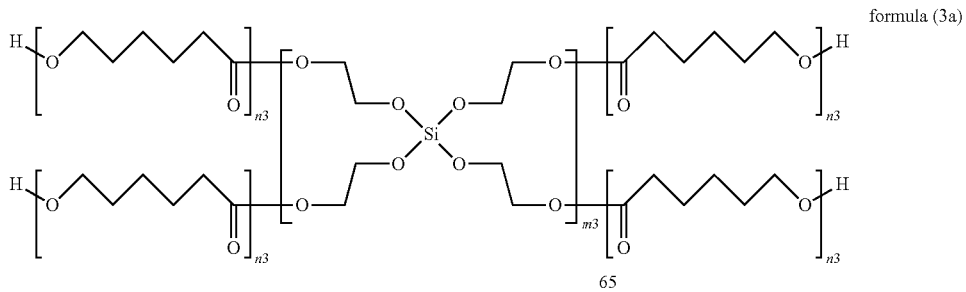

m3 is 1, and n3 is ranged between 4 and 6.

Further, the intermediate is mixed with 117.84 g of isophorone diisocyanate (IPDI), reacted at 45° C. for 5 hours, and then 0.017 g of dibutyltin dilaurate is dropped to form a solution F. Then, 104.12 g of 2-hydroxyethyl methacrylate (HEMA) and 0.014 g of dibutyltin dilaurate are dropped into the solution F and reacted at 45° C. for 3 hours.

Finally, tetrahydrofuran (THF) in the solution F is removed by evaporation to obtain a product with a weight average molecular weight (Mw) of 2575. The product is represented by the following formula (3b):

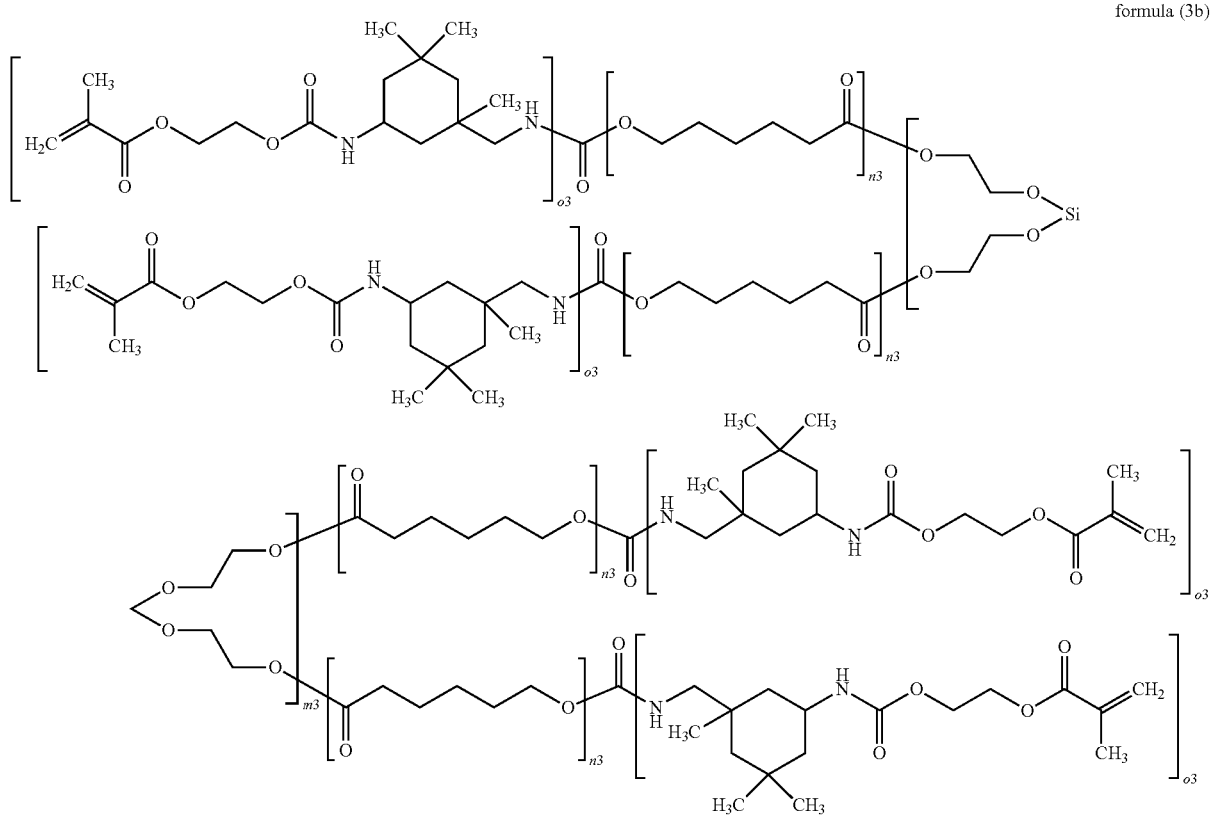

formula (3b)

m3 is 1, n3 is ranged between 4 and 6, and o3 is ranged between 4 and 5.

The following [Table 1] is experimental examples prepared according to the aforementioned material to illustrate the specific efficacies of the contact lens. Formula (1), Formula (2) and Formula (3) are the above-mentioned silicone hydrogel compositions; HEMA, NVP, MAA, DMA are the hydrophilic monomers; Darocur®1173, Irgacure®819 are the photoinitiators; IPA is the solvent; and TMPTMA is the crosslinking agent. In addition, the weight unit of [Table 1] is gram.

TABLE 1

| | Experimental example | | | |
|---|---|---|---|---|
| | 1 | 2 | 3 | 4 |
| Formula (1) | 40 | 45 | 41 | 39 |
| Formula (2) | 16.5 | 0 | 13 | 13 |
| Formula (3) | 5 | 16.5 | 0 | 2 |
| HEMA | 20 | 20 | 20 | 20 |
| NVP | 10 | 10 | 5 | 5 |
| MAA | 0.5 | 0.5 | 2 | 2 |
| DMA | 5 | 5 | 10 | 10 |
| Darocur ®1173 | 1 | 1 | 1 | 1 |
| Irgacure ®819 | 2 | 2 | 2 | 2 |
| IPA | 0 | 0 | 5 | 5 |
| TMPTMA | 0 | 0 | 1 | 1 |

After mixing the materials of each of the above experimental examples, the materials are irradiated with 55 mW/m² ultraviolet light for 100 seconds to cure to form a contact lens. Then oxygen permeability, moisture content and Young's modulus are tested for the experimental examples 1, 2, 3, and 4. The test results are shown in [Table 2] below, wherein the oxygen permeability, moisture content and Young's modulus are measured based on industry ISO standards.

TABLE 2

| | Experimental example | | | |
|---|---|---|---|---|
| | 1 | 2 | 3 | 4 |
| Oxygen permeability (Dk) | 84 | 70 | 100 | 115 |
| Moisture content (%) | 45 | 32 | 43 | 40 |
| Young's modulus(MPa) | 0.7 | 1.2 | 0.2 | 0.4 |

It can be seen from [Table 2] that the contact lens prepared according to the aforementioned materials including a high oxygen permeability (Dk) ranged between 70 and 115, a high moisture content ranged between 30% and 45%, and a low Young's modulus ranged between 0.2 MPa and 1.2 MPa. Thus, a user has more oxygen to contact the cornea to maintain eye moisture when wearing the contact lens, and at the same time the material is capable of reducing the sensation of foreign objects in contact with the eye caused by the contact lens, thereby improving the wearing comfort and extending the wearing time.

What is claimed is:

1. A material for manufacturing contact lenses, comprising:

a first composition represented by the following formula (1):

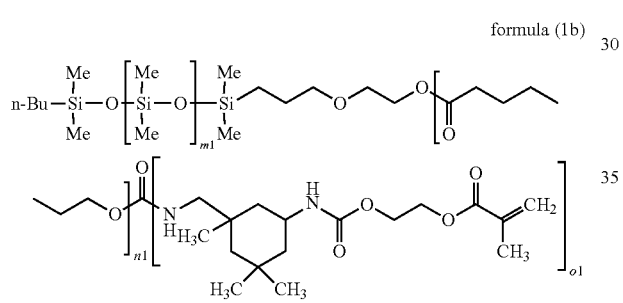

formula (1b)

wherein, n1 is ranged between 1 and 1.5, o1 is ranged between 1 and 2, and m1 is ranged between 1 and 3;

a second composition represented by the following formula (2b):

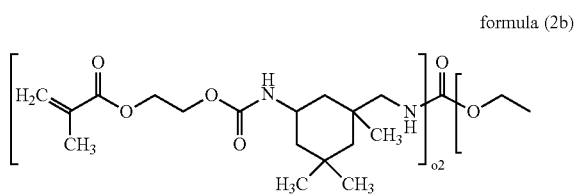

formula (2b)

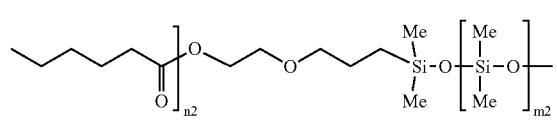

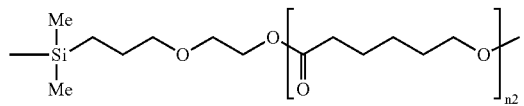

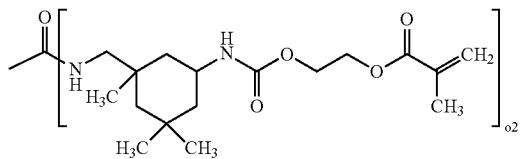

wherein n2 is ranged between 1 and 5, o2 is ranged between 1 and 2, and m2 is ranged between 1 and 3;

at least one hydrophilic monomer; and at least one photoinitiator.

2. The material as claimed in claim 1, comprising:

a third composition represented by the following formula (3b):

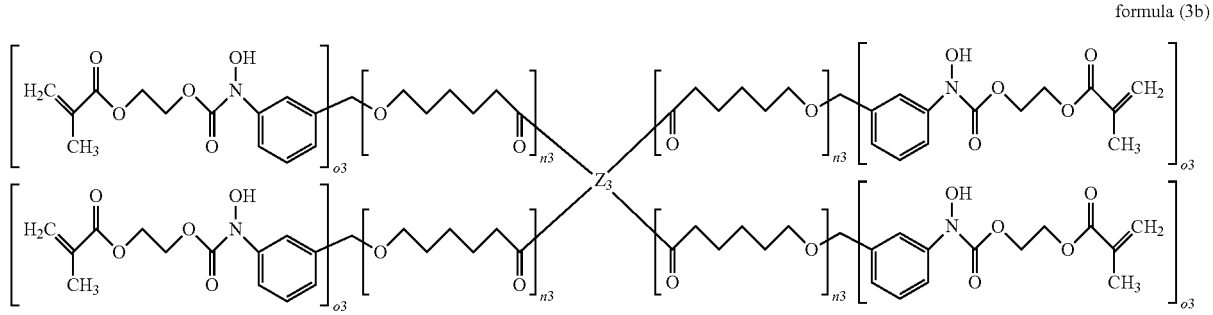

formula (3b)

wherein n3 is ranged between 4 and 6, o3 is ranged between 4 and 5, and m3 is 1.

3. The material as claimed in claim 1, wherein the hydrophilic monomer is selected from the group consisting of 2-hydroxyethyl methacrylate, N-vinylpyrrolidone, methacrylic acid, N,N-dimethylacrylamide and combinations thereof.

4. The material as claimed in claim 1, wherein the material further comprising a solvent and a crosslinking agent, the solvent is isopropyl alcohol, and the crosslinking agent is trimethylolpropane trimethacrylate.

5. A contact lens, comprising the material as claimed in claim 1.

6. A material for manufacturing contact lenses, comprising:

a first composition represented by the following formula (1b):

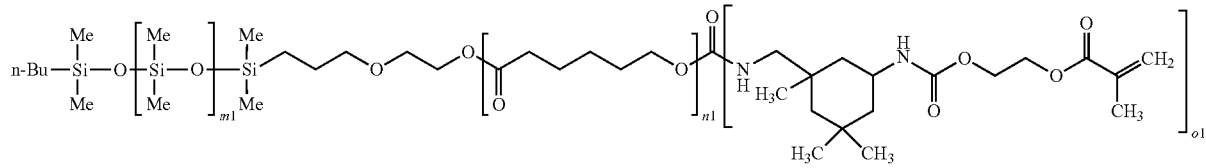

formula (1b)

wherein n1 is ranged between 1 and 1.5, o1 is ranged between 1 and 2, and m1 is ranged between 1 and 3;

a third composition represented by the following formula (3b):

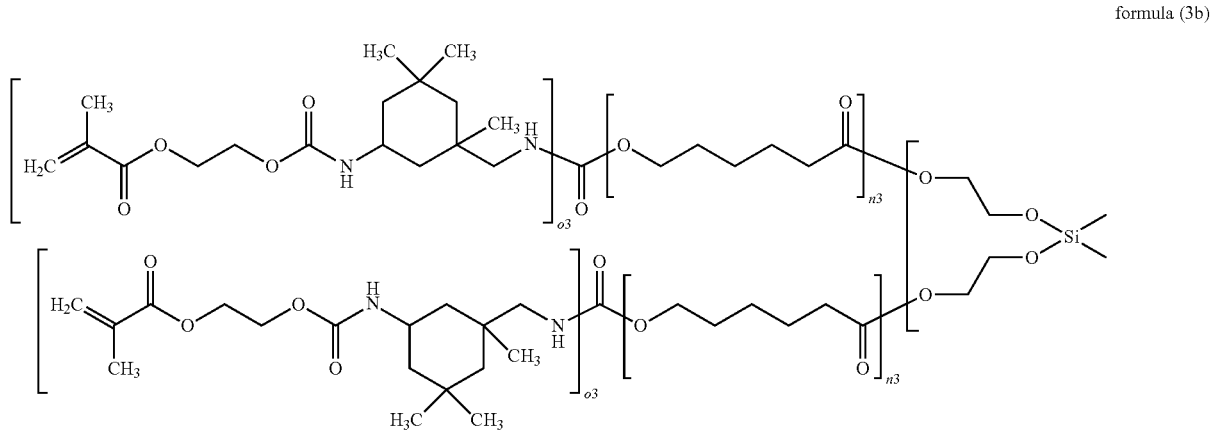

formula (3b)

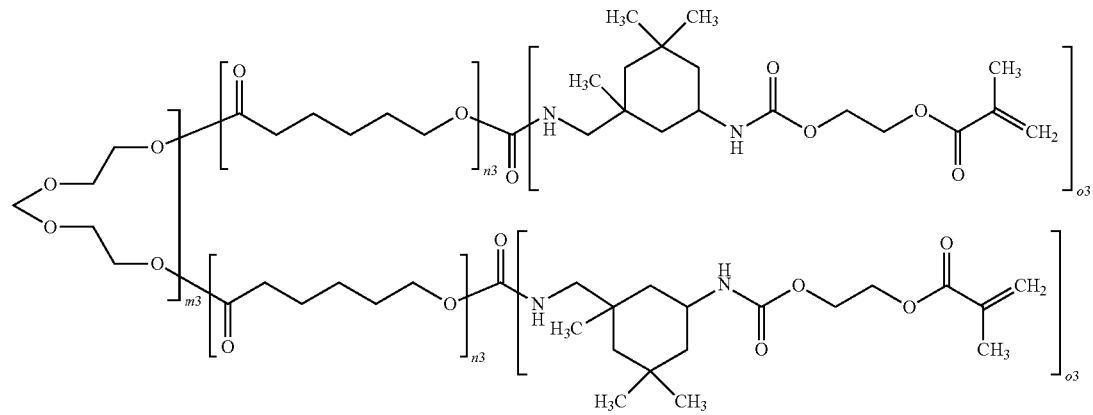

wherein, n3 is ranged between 4 and 6, o3 is ranged between 4 and 5, and m3 is 1;

at least one hydrophilic monomer; and at least one photoinitiator.

7. The material as claimed in claim 6, wherein the at least one hydrophilic monomer is selected from the group consisting of 2-hydroxyethyl methacrylate, N-vinylpyrrolidone, methacrylic acid, N,N-dimethylacrylamide, and combinations thereof.

8. The material as claimed in claim 6, wherein the material further comprises a solvent and a crosslinking agent, the solvent is isopropyl alcohol, and the crosslinking agent is trimethylolpropane trimethacrylate.

9. A contact lens, comprising the material as claimed in claim 6.

* * * * *